United States Patent

Sullivan et al.

[11] Patent Number: 5,116,060
[45] Date of Patent: May 26, 1992

[54] GOLF BALL CORE CROSSLINKED WITH T-AMYL PEROXIDE AND BLENDS THEREOF

[75] Inventors: Michael J. Sullivan, Chicopee; R. Dennis Nesbitt, Westfield; John L. Nealon, Springfield, all of Mass.

[73] Assignee: Lisco, Inc., Tampa, Fla.

[21] Appl. No.: 672,189

[22] Filed: Mar. 20, 1991

[51] Int. Cl.⁵ .............................................. A63B 37/06
[52] U.S. Cl. ................................. 273/218; 273/235 R; 524/908; 525/265
[58] Field of Search ............ 524/908; 273/218, 235 R; 525/265

[56] References Cited

U.S. PATENT DOCUMENTS

| | | | |
|---|---|---|---|
| 4,483,537 | 11/1984 | Hanada et al. | 273/220 |
| 4,546,980 | 10/1985 | Gendreau et al. | 273/218 |
| 4,607,060 | 8/1986 | Kmiec et al. | 521/95 |
| 4,636,528 | 1/1987 | Kamens et al. | 521/95 |

Primary Examiner—John C. Bleutge
Assistant Examiner—R. Dean, Jr.

[57] ABSTRACT

Golf balls of improved coefficient of restitution provided by polymerizing an elastomer or admixture of elastomers in the presence of at least one metallic salt of an unsaturated carboxylic acid and t-amyl peroxide or blends thereof as a free radical initiator.

10 Claims, No Drawings

GOLF BALL CORE CROSSLINKED WITH T-AMYL PEROXIDE AND BLENDS THEREOF

BACKGROUND OF THE INVENTION

This invention relates to golf balls. More particularly it relates to solid core golf balls having an improved coefficient of restitution.

Unitary golf balls, also known as two-piece solid core golf balls, are widely accepted in the golfing industry as being highly durable. This is attributed to the presence of the solid core and a unitary or multi-ply highly cut resistant cover. As with all golf balls, the industry continually endeavors to find ways to improve the distance a golf ball will travel when hit by a golf club. This improvement activity is limited, however, by the rules of the United State Golf Association which state that the intitial velocity of a golf ball cannot exceed 250 ±5 feet/second.

It is recognized that the distance a golf ball will travel when struck by a golf club is a function of many factors such as angle of trajectory, clubhead speed and coefficient of restitution. Of these three factors, the golf ball manufacturers have control over the latter, i.e. coefficient of restitution ("COR") which is the ratio of the outgoing velocity to the incoming velocity of a golf ball as expressed as a decimal. Such control is exercised by the golf ball manufacturers through the methods and materials employed to produce golf balls.

As is known in the industry, the COR of a golf ball is a function of both the core and the cover. The greater the contribution of the core, the lesser need be the contribution of the cover. As the core comprises the major portion of any golf ball, COR improvements have primarily been achieved by modification of the core; however, said modification must not exessively effect the compressibility of the golf ball which is a prerequisite to playability of the golf ball.

There are a number of golf balls disclosed in the prior art which demonstrate a tradeoff between high COR and compressibility. For example, U.S. Pat. No. 4,726,590 (Molitor) discloses one piece golf ball cores which exhibit a maximum COR of 0.815; however, said golf balls also exhibit decreasing compressibility with increasing COR.

U.S. Pat. No. 4,838,556 (Sullivan) discloses a golf ball with a solid core wherein the COR is increased due to the presence of a special dispersing agent. While the maximum COR disclosed was 0.816, this occurred at the lowest compressibility.

U.S. Pat. No. 4,852,884 (Sullivan) discloses a solid core for a golf ball which is formed using a metal carbonate accelerator. The highest COR achieved in this Patent, while still maintaining a satisfactory compressibility, was 0.807. Similarly, U.S. Pat. No. 4,844,471 (Terrence) forms a solid core using a dialkyl tin fatty acid. Employing this addition, the highest COR attained, while maintaining a satisfactory compressibility, was 0.809.

While not directly addessing the problem of increasing the COR while retaining sufficient compressibility, U.S. Pat. No. 4,546,980 (Gendreau et al) discloses a solid core which contains two or more free radical initiators, at least two of which exhibit a different reactivity during the curing process. Golf balls made under the disclosure of this invention are claimed to have an initial velocity of at least 0.5 feet/second higher than the same golf ball made with only one initiator.

Accordingly, it is an object of the present invention to provide a core for a golf ball which provides a high COR and good compressibility.

It is a further object of the present invention to provide golf balls which exhibit superior playability while maintaining a high COR.

SUMMARY OF THE INVENTION

The present invention relates to golf ball cores produced by polymerizing polybutadiene or mixtures thereof with other elastomers in the presence of at least one metallic salt of an unsaturated carboxylic acid and t-amyl peroxide or blends thereof as a free radical initiator. It has been found that the substitution of the t-amyl peroxide free radical initiator for other known peroxide initiators produces an unexpected increase in COR.

The core compositions of the present invention may be based on polybutadiene, and mixtures of polybutadiene with other elastomers. It is preferred that the base elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers may also be utilized. Most preferably, cis-polybutadiene having a weight-average molecular weight of from about 100,000 to about 500,000 is employed.

The saturated carboxylic acid component of the core composition is the reaction product of the selected carboxylic acid or acids and an oxide or carbonate of a metal such a zinc, magnesium, barium, calcium, lithium, sodium, potassium, cadmium, lead, tin and the like. Preferably, the oxides of polyvalent metals such as zinc, magnesium and cadmium are used, and most preferably the oxide is zinc oxide.

Exemplary of the unsaturated carboxylic acids which find utility in the present core compositions are acrylic acid, methacrylic acid, itaconic acid, crotonic acid, sorbic acid and the like, and mixtures thereof. Preferably, the acid component is either acrylic or methacrylic acid. Usually, from about 20 to about 50, and preferably from about 25 to about 40 parts by weight of the carboxylic acid salt is included in the core composition.

The free radical initiator employed in the present invention is a t-amyl peroxide or a blend of a t-amyl peroxide with an organic peroxide having a similar half life. while it is known that t-amyl peroxides are commonly recommended as polymerization initiators for vinyl monomers such as a vinyl chloride, ethylene, vinyl acetates and as curing agents for polyester resins, it is believed that its use in the polymerization of butadiene is novel. It is postulated that the superior physical properties provided to golf ball core formulations by the use of t-amyl peroxides is attributable to the formation of crosslinks through chain addition and not via hydrogen abstraction which can lead to polymer degradation. The t-amyl peroxides provide fast reactivity for short cure cycles and adequate crosslink density without inducing degradation of the butadiene polymer.

The t-amyl peroxides and blends thereof of the present invention are generally employed in amounts of from 0.1 to about 1.0 parts by weight per 100 parts of rubber.

Examples of suitable t-amyl peroxides for the purposes of this invention are Lupersol 533-M75 2,2-di(tert-amylperoxy) propane and Lupersol 531-80B 1,1-di(tert-amylperoxy) cyclohexane, both of which are manufactured by Pennwalt Corporation, Buffalo, N.Y.

As noted above, the t-amyl peroxides employed in the present invention may also be blended with other organic peroxides which have a similiar half life. Such other organic peroxides include the peroxyketals such as Lupersol 231 which is 1,1-bis(tertbutylperoxy) 3,3,5 trimethylcyclohexane and which has a half life at 160° C. of about 1 minute (manufactured by Pennwalt Corporation). It has been found, however, that the blends should be formulated so that the major portion of the blend is a t-amyl peroxide.

Optionally dispersing agents may also be employed in the core compositions of the present invention. Said dispersing agents may be anionic, cationic, noionic of amphorteric in properties as a surfactant. If desired, mixtures of selected dispersing agents may be used. Suitable dispersing agents include alkali metal salts of fatty acids having from about 12 to about 20 carbon atoms, such as caprylic, lauric and stearic acid and the like; sulfated fats such as sulfated oleic acid, sulfated castor oil, sulfated coconut oil and the like; sodium salts of alkylated aromatic sulfonic acids such a naphthelene sulfonic acid, substituted benzoid alkyl sulfonic acids and the like; monoaryl and monoalkyl ethers of dialkylene glycols such as monomethyl and monophenyl either of diethylene glycol and polyethylene glycol. Additionally, such dispersing agents as ammonium salts of alkyl phosphates, sodium salts of carboxylated electrolytes, sodium alkyl sulfates, monosodium salt of sulfated methyl oleat and the like may be used. Preferably, the dispersing agent is a sodium salt of polymerized alkyl naphthalene sulfonic acid or sodium salt of polymerized substituted benzoid alkyl sulfonic acids such as DARVAN (R. T. Vanderbilt Co.).

The dispersing agent is optionally included in an amount of from about 0.1 to about 5.0 parts by weight per 100 parts of elastomer, perferably from about 0.2 to about 2.0 parts by weight per 100 parts of elastomer.

The core compositions of the present invention may additionally contain any other suitable and compatible modifying ingredient including, but not limited to, fillers, metal oxides, fatty acids and diisocyanates.

As fillers, any known and conventional filler material, or mixtures thereof, may be used. Such fillers as are incorporated into the core compositions should be in finely divided form, as for example, in a size generally less than about 20 mesh and preferably less than about 100 mesh U.S. standard size. Suitable fillers include silica, silicates, zinc oxide, carbon black, cork, titania, cotton flock, cellulose flock, leather fiber, plastic and-/or leather flour, asbestos, glass fibers, metal carbonates and talc. Particularly useful is the oxide or carbonate of the cation used in forming the metal salt of the unsaturated carboxylic acid component.

The amount of filler included in the core composition is primarily dictated by weight restrictions and preferably is included in amounts of from about 10 to about 100 parts by weight per 100 parts elastomer.

Fatty acids may also be included in the compositions, functioning to improve moldability and processing. Generally, free fatty acids having from 10 to about 40 carbon atoms, and preferably having from about 15 to about 20 carbon atoms, are used. Examplary of suitable fatty acids are stearic acid and linoleic acids, as well as mixtures thereof. When included in the core compositions, the fatty acid component is present in amounts of from about 1 to about 15, preferably in amounts of from about 2 to about 5 parts by weight based on 100 parts elastomer.

It is preferred that the core compositions include stearic acid as the fatty acid adjunct in an amount of from about 2 to about 5 parts by weight per 100 parts of elastomer.

Diisocyanates may also be optionally included in core compositions. When utilized, the diisocyanates are included in amounts of from about 0.2 to about 5.0 parts by weight based on 100 parts elastomer. Exemplary of suitable diisocyanates is 4,4'-diphenylmethane diisocyanate and other polyfunctional isocyanates known to the art.

In producing golf ball cores utilizing the present compositions, the selected components are intimately mixed using, for example, two roll mills or a Banbury mixer until the mixture is uniform, usually over a period of from about 5 to about 20 minutes. The sequence of addition of components is not critical.

A preferred blending sequence is one wherein elastomer, zinc salt, metal oxide, filler, fatty acid and surfactant are blended for about 7 minutes in an internal mixer such as a Banbury mixer. As a result of shear during mixing the temperature rises to about 150° F. The initiator is then added and the mixing continued until the temperature reaches about 190° F. whereupon the batch is discharged onto a two roll mill, mixed for about one minute and sheeted out.

The sheet is then placed in a Barwell preformer and slugs are produced. The slugs are then subjected to compression molding at about 325° F. for about 14 minutes. After molding and cooling, the cooling effected at room temperature for about 4 hours, the molded cores are subjected to a centerless grinding operation whereby a thin layer of the molded core is removed to produce a round core having a diameter of 1.545 inches.

Usually the curable component of the composition will be cured by heating the composition at elevated temperatures on the order of from about 275° F. to about 350° F., preferably from about 295° F. to about 325° F., with molding of the composition effected simultaneously with the curing thereof. The composition can be formed into the core structure by any one of a variety of molding techniques, e.g. injection, compression or transfer molding. When the composition is cured by heating, the time required for curing will normally be of short duration, generally from about 10 to about 20 minutes, depending upon the amount and activity of the selected curing agent. Those of ordinary skill in the art of free radical curing agents for polymers are knowledgable of cure times and temperatures required to effect optimum results from any specific free radical agent.

The core is then converted into a golf ball by providing at least one layer of covering material, ranging in thickness from about 0.050 to about 0.250 inch, preferably from about 0.060 to about 0.090 inch.

The cover composition is preferably made from ethylene-acrylic acid or ethylene-methacrylic acid copolymers neutralized with mono- or divalent metals such as sodium, potassium, lithium, calcium, zinc or magnesium.

While the cover composition may be any of a number of covering materials known in the art, such as balata, polyolefins and the like, it is preferred, for imparting durability to the ball, to employ ionomeric resins, such as those produced by neutralizing the copolymers described in U.S. Pat. No. 3,421,766 and British Patent No. 963,380 using the procedures set out in Canadian Patent Nos. 674,595 and 713,631. In accordance with the procedures set forth in the aforementioned Patents, the ionomeric resin is produced by copolymerizing a selected olefin and unsaturated carboxylic acid to provide a copolymer having the acid units randomly distributed along the polymer chain, with the relative amounts of reactants adjusted to provide a copolymer containing from about 9 to about 15 weight percent of the carboxylic acid moiety. At least about 18 percent, preferably from about 18 to about 60 percent of the acid groups are then neutralized by metal ions having a valence of from 1 to 4, including sodium, potassium, zinc, calcium, magnesium and the like.

Suitable olefins include ethylene, propylene, butene-1, hexene-1 and the like. Unsaturated carboxylic acids which may be copolymerized with the selected olefin include acrylic acid, methacrylic acid, ethacrylic acid, alpha-chloroacrylic acid, crotonic acid, maleic acid, fumaric acid, itaconic acid and the like. Preferably, the ionomeric resin is a copolymer of ethylene with either acrylic or methacrylic acid having from about 9 to about 15 weight percent acid moiety.

The golf ball can be produced by covering the core using one of several available methods. For example, a core may be placed in the center of golf ball mold and the cover composition injected into and retained in the surrounding space for a period of time at a mold temperature of from about 40° F. to about 120° F.

Alternatively, the cover composition may be injection molded at temperatures of from about 200° F. to about 450° F. into smooth-surfaced hemispherical shells, a core enveloped with two such shells placed in a dimpled golf ball mold at temperatures on the order of from about 100° F. to about 200° F.

Coloration of the golf ball may be effected by including a selected coloring agent uniformly dispersed in the cover composition, or by applying one or more coatings of paint to the ball after molding. Indicia is applied to complete the product.

The invention is further described in the following examples wherein the parts are by weight unless otherwise specified.

EXAMPLES

Employing the formulations tabled below, golf ball cores having an average finished diameter of about 1.540 inches were processed by compression molding and subsequent removal of a surface layer by grinding. The amounts of the ingredients in the examples are expressed in parts by weight and each core was formulated using 100 parts of high cis content polybutadiene.

| Ingredients | 1 | 2 | 3 | 4 | 5 | 6 | 7 | 8 | 9 | 10 | 11 | 12 | 13 |
|---|---|---|---|---|---|---|---|---|---|---|---|---|---|
| Zinc diacrylate | 30 | 30 | 30 | 30 | 30 | 30 | 30 | 30 | 30 | 30 | 30 | 30 | 30 |
| Ground flash | 20 | 20 | 20 | 20 | 20 | 20 | 20 | 20 | 20 | 20 | 20 | 20 | 20 |
| Zinc oxide | 14.6 | 14.6 | 14.6 | 14.6 | 14.6 | 14.6 | 14.6 | 14.6 | 14.6 | 14.6 | 14.6 | 14.6 | 14.6 |
| Calcium carbonate | 7.5 | 7.5 | 7.5 | 7.5 | 7.5 | 7.5 | 7.5 | 7.5 | 7.5 | 7.5 | 7.5 | 7.5 | 7.5 |
| Zinc stearate | 20 | 20 | 20 | 20 | 20 | 20 | 20 | 20 | 20 | 20 | 20 | 20 | 20 |
| Lupersol 231-XL | 0.9 | — | — | — | — | 0.5 | 0.5 | 0.5 | 0.5 | — | — | — | — |
| Lupersol 531-80B | — | 0.9 | — | — | — | 0.5 | — | — | — | 1.8 | — | — | — |
| Lupersol TAEC ** | — | — | — | 0.9 | — | — | — | 0.5 | — | — | — | 1.8 | — |
| Lupersol 533-M75 | — | — | — | — | 0.9 | — | — | — | 0.5 | — | — | — | 1.8 |
| T-amyl perbenzoate | — | — | 0.9 | — | — | — | 0.5 | — | — | — | 1.8 | — | — |
| Mondur M * | 1.0 | 1.0 | 1.0 | 1.0 | 1.0 | 1.0 | 1.0 | 1.0 | 1.0 | 1.0 | 1.0 | 1.0 | 1.0 |
| WT (GMS) | 36.9 | 36.8 | 36.8 | 36.7 | 36.4 | 36.9 | 36.8 | 36.9 | 36.5 | 36.9 | 36.9 | 36.9 | 36.1 |
| Compression (Riehle) | 58 | 51 | 66 | 64 | 50 | 51 | 58 | 60 | 51 | 53 | 60 | 64 | 48 |
| COR | .802 | .805 | .783 | .781 | .803 | .807 | .798 | .793 | .805 | .773 | .788 | .781 | .777 |

* pp-diphenylmethane diisocyanate by Mobay Chemical Corp.
** oo-t-amyl o-(2-ethylhexyl) monoperoxy carbonate As is shown from the above Examples, formulations employing a tert-amyl peroxide or a blend of tert-amyl peroxide with a compatible organic peroxide such as Lupersol 231 provided the highest COR readings where the free radical initiator is present in amounts of about 1.0 parts by weight or less based on 100 parts high cis polybutadiene.

In addition to the above, several golf ball cores were produced from a formulation similar to the basic formulation used in Examples 1-13 but wherein the active level of the peroxide used was varied. The results areas follows:

| EXAMPLE 14 | | | |
|---|---|---|---|
| Lupersol 231-XL | | | |
| Active level, pph | 0.36 | 0.26 | 0.14 |
| Weight (gms.) | 36.7 | 36.5 | 36.5 |
| Compression (Riehle) | 65 | 65 | 64 |
| COR | .797 | .790 | .774 |
| EXAMPLE 15 | | | |
| Lupersol 531-80B | | | |
| Active level, pph | 0.72 | 0.51 | 0.29 |
| Weight (gms.) | 36.7 | 36.5 | 36.6 |
| Compression (Riehle) | 57 | 60 | 66 |
| COR | .806 | .800 | .798 |
| EXAMPLE 16 | | | |
| Lupersol 533-M75 | | | |
| Active level, pph | 0.68 | 0.48 | 0.27 |
| Weight (gms.) | 36.4 | 36.3 | 36.2 |
| Compression (Riehle) | 56 | 61 | 66 |
| COR | .802 | .800 | .795 |
| EXAMPLE 17 | | | |
| Lupersol 231-XL/Lupersol 531-80B | | | |
| Active level, pph | 0.18/0.36 | 0.14/0.28 | |
| Weight (gms.) | 36.6 | 36.6 | |
| Compression (Riehle) | 58 | 58 | |
| COR | .807 | .804 | |
| EXAMPLE 18 | | | |
| Lupersol 231-XL/Lupersol 533-M75 | | | |
| Active level, pph | 0.18/0.34 | 0.14/0.26 | |
| Weight (gms.) | 36.6 | 36.4 | |
| Compression (Riehle) | 54 | 58 | |

| -continued | | |
|---|---|---|
| COR | .808 | .808 |

As shown in Examples 14–18, the coefficient of restitution (COR) of golf ball formulations employing the tert-amyl peroxides of the present invention or blends thereof with compatible peroxides is consistantly higher than the COR of golf ball formulations employing a free radical initiator of the prior art, i.e. Lupersol 231-XL.

While certain representative embodiments and details of the present invention have been shown for the purposes of illustrating the invention, it will be apparent to those skilled in the art that various changes and modifications may be made therein without departing from the spirit or scope of the invention.

What is claimed is:

1. A golf ball comprising a cove and molded spherical core;
   said core comprising a base elastomer selected from the group consisting of polybutadiene having a molecular weight of from about 50,000 to about 500,000 and admixtures of said polybutadiene with other elastomers,
   at least one metallic salt of an alpha, beta-ethylenically unsaturated monocarboxylic acid, and
   a free radical initiator selected from the group consisting of a tert-amyl peroxide and blends of tert-amyl peroxides and compatible organic peroxides.

2. The golf ball of claim 1 wherein said free radical initiator is a tert-amyl peroxide and is present in an amount of from 0.1 to 1.0 parts by weight per 100 parts of elastomer.

3. The golf ball of claim 2 wherein said tert-amyl peroxide is 1,1-di(tert-amylperoxy) cyclohexane.

4. The golf ball of claim 2 wherein said tert-amyl peroxide is 2,2-di(tert-amylperoxy) propane.

5. The golf ball of claim 1 wherein said free radical initiator is a blend of a tert-amyl peroxide and a peroxyketal, both having a half life of about 1 minute at 160° C.

6. The golf ball of claim 5 wherein said peroxyketal is 1,1-bis(tert-butylperoxy) 3,3,5-trimethylcyclohexane.

7. The golf ball composition of claim 5 wherein said free radical initiator blend contains at least 50% by weight of a tert-amyl peroxide.

8. The golf ball composition of claim 1 wherein said elastomer is cis-polybutadiene.

9. The golf ball composition of claim 8 wherein said metallic salt of an alpha, beta-ethylenically unsaturated monocarboxylic acid is zinc diacrylate.

10. A golf ball comprising a cover and a molded spherical core;
    said core comprising a cis-polybutadiene having a molecular weight of from about 100,000 to 500,000, zinc diacrylate, and
    0.1 to 1.0 parts by weight per 100 parts of cis-polybutadiene of a tert-amyl peroxide free radical initiator.

* * * * *